United States Patent [19]

Griffin

[11] 4,174,601
[45] Nov. 20, 1979

[54] METHOD AND APPARATUS FOR HARVESTING TOBACCO

[75] Inventor: J. Curtis Griffin, Branford, Fla.

[73] Assignee: Harrington Manufacturing Co., Lewiston, N.C.

[21] Appl. No.: 789,209

[22] Filed: Apr. 20, 1977

[51] Int. Cl.² ............................................. A01D 45/16
[52] U.S. Cl. ........................................ 56/27.5; 56/503
[58] Field of Search ..................... 56/500, 503, 327 R, 56/27.5

[56] References Cited

U.S. PATENT DOCUMENTS

| 2,067,104 | 1/1937 | Spell | 56/503 |
| 2,648,942 | 8/1953 | Grant et al. | 56/503 |
| 2,836,950 | 6/1958 | Anderson | 56/27.5 |
| 3,482,379 | 12/1969 | Splinter et al. | 56/27.5 |
| 3,507,103 | 4/1970 | Pickett et al. | 56/27.5 |
| 3,556,422 | 1/1971 | Burkett | 56/503 |
| 3,601,959 | 8/1971 | Pinkham | 56/27.5 |
| 3,857,225 | 12/1974 | Knudson | 56/503 |
| 3,885,376 | 5/1975 | Johnson | 56/27.5 |
| 3,948,553 | 4/1976 | Suggs | 294/5.5 |
| 4,037,392 | 7/1977 | Taylor et al. | 56/27.5 |

Primary Examiner—Russell R. Kinsey
Assistant Examiner—Paul J. Hirsch
Attorney, Agent, or Firm—Mills & Coats

[57] ABSTRACT

The present invention relates to a method and apparatus for harvesting tobacco wherein the apparatus includes a tobacco harvester having a stalk cutting head comprised of two sets of generally vertically spaced circular saw blades disposed in side-by-side relationship that are adapted during harvesting to cut standing tobacco stalks into relatively short stalk sections. Tobacco leaf material extending from the cut stalk sections remain generally intact with the cut stalk sections such that during harvest the tobacco crop material is harvested in a manner such that the respective stalk sections and tobacco leaf material are harvested together in one operation.

4 Claims, 15 Drawing Figures

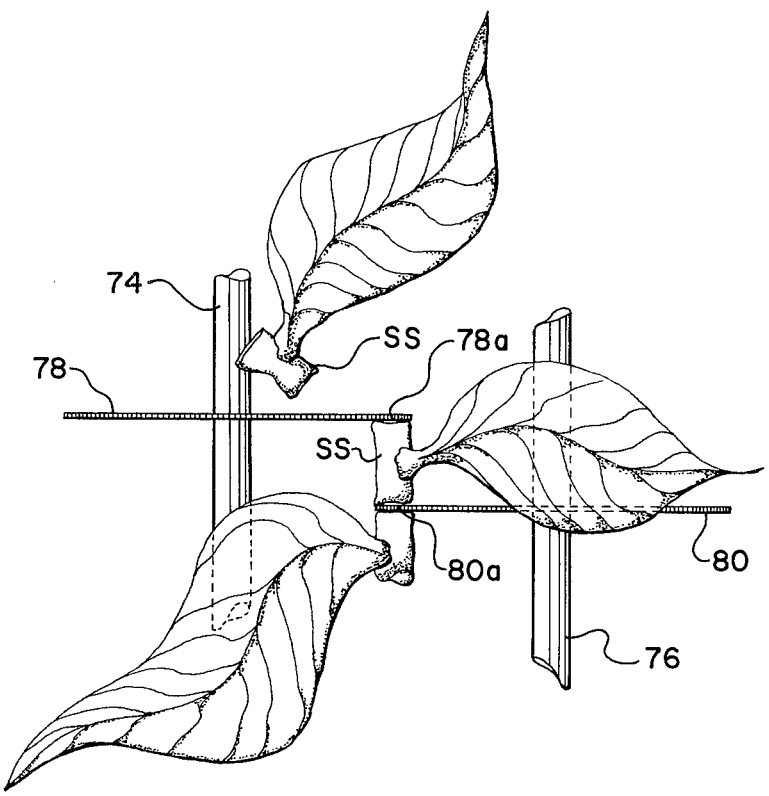
FIG. 9
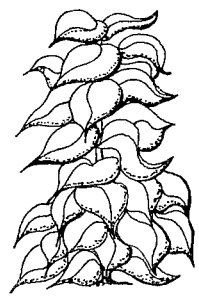
FIG. 10
FIG. 11
FIG. 12
FIG. 13
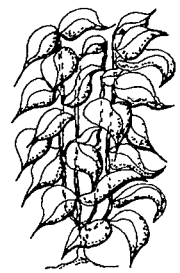
FIG. 14
FIG. 15

METHOD AND APPARATUS FOR HARVESTING TOBACCO

The present invention relates to tobacco harvesters and methods of harvesting tobacco, and more particularly to a tobacco harvester and method of harvesting tobacco that entails directly harvesting both tobacco stalk and leaf material together in one single operation.

BACKGROUND OF THE INVENTION

Over the past years, the production cost of tobacco has steadily increased due to the increases in the cost of fertilizer, fuel, farm equipment and machinery, labor and other materials and services required by the tobacco farmer. With the increased production cost of tobacco, the price paid the tobacco farmer for the produced tobacco has also increased and in the flue-cured region of the United States, tobacco prices at auction now reach as high as $1.10 a pound, and are expected to go even higher. Tobacco produced by farmers usually undergoes further grading, processing, and treatment by the manufacturers at facilities known as redrying plants. This treatment, grading and processing of tobacco by the cigarette manufacturers adds still additional cost to each pound of usable tobacco material that forms a part of a cigarette, cigar or other tobacco product.

The total cost of natural tobacco material including processing cost by the manufacturer, has prompted several of the large cigarette makers to seek or consider a tobacco substitute material that may be mixed or blended with natural tobacco material in small percentages to yield a less expensive tobacco product. Although aroma, flavor and taste may be difficult to duplicate with a tobacco substitute, the present invention addresses itself to a tobacco harvester and method of harvesting tobacco that has the capability to reduce the production cost of natural tobacco material, even to the point of being competitive with the expected cost of such substitutes while still being a natural tobacco product with true tobacco aroma, flavor and taste.

SUMMARY OF INVENTION

The present invention presents an automatic tobacco harvester having a stalk cutting head that is adapted to directly harvest portions of the tobacco stalks by cutting the stalk into sections and conveying the cut stalk sections and the associated attached tobacco leaf material to a collection area. To accomplish this, the stalk cutting head includes first and second sets of circular saw blades disposed in side-by-side relationship, each set of saw blades being axially spaced and secured on a generally vertical shaft. The circular saw blades of each set are staggered relative to the circular saw blades of the other set and are disposed such that intermediate blades of each set extend slightly between two blades of the adjacent set. Therefore, the circular saw blades of each set overlap about an area generally midway between the outer extremities of the circular saw blades such that in cutting the stalks during harvest consecutive vertically spaced blades, one blade from each set, cooperate to cut a stalk section. Because the blades of each set are driven in counter directions relative to each other the cutting action of the blades tend to fling the respective cut stalk sections outwardly from the stalk cutting head to where the cut stalk sections are directed onto conveying means carried by the tobacco harvester.

The method of harvesting tobacco, as disclosed herein, basically entails harvesting standing stalks of tobacco by simultaneously cutting and harvesting both the stalk and leaf portions of the tobacco crop together. In particular, portions of the stalk are cut into relatively short stalk sections such that substantial portions of the surrounding leaf material remain attached to the stalk sections. This tobacco material, including both the stalk and leaf sections, is conveyed to a collection area and the tobacco material can then be cured and dried in conventional fashion.

To increase production per acre and to generally decrease the overall production cost per pound, the following type of practice may be followed. First, the tobacco can be planted in rows with the tobacco stalks closely spaced. Once the tobacco stalks have reached maturity, the tobacco leaves about the lower portion of the stalk can be defoliated or primed in conventional manner, leaving the stalks and tobacco leaf material about the upper portion of the stalk. After this, the upper portions of the stalk, including the surrounding tobacco leaf material, can be harvested by the stalk cutting head of the present invention wherein the upper stalk is cut into short sections by the plurality of circular saw blades. The cut stalk sections and associated attached leaf material may be racked or containerized for curing and drying according to conventional principles. The standing stalk is then cut about six to eight inches from ground level and the cut stalk portions are removed from the field, leaving a stalk stub. This stalk stub will give rise to a voluntary growth of tobacco sucker foliage. Sometimes this sucker foliage will include as many as two or three sprouting stalks and sucker leaves extending from the stalks from the ground up. This part of the crop is referred to as the second cutting, and is completely harvested from the ground up by the stalk cutting head discussed above. As with the upper first or primary crop discussed above, the circular saw blades cut the stalks of the sucker growth foliage into generally short sections and this voluntary tobacco sucker growth is cured and dried in conventional manner after field harvesting. Therefore, the total crop consists of the primary growth plus the voluntary sucker growth foilage. The effect of this is that substantially more poundage is achieved per acre of crop material and the actual harvesting cost per pound is reduced. Therefore, it is appreciated that in following this method that the cost of producing the tobacco material is substantially lowered.

It is, therefore, an object of the present invention to provide a tobacco harvester that will reduce the cost of harvesting tobacco, and consequently will contribute to reducing total production cost of tobacco.

A further object of the present invention is to provide a tobacco harvester capable of harvesting both tobacco stalk and leaf material simultaneously together in one single operation.

A further object of the present invention is to provide a tobacco harvester that is capable of harvesting both stalk and leaf material together without damaging or bruising the harvested crop to the extent that the harvested crop is unacceptable or unusable.

Another object of the present invention is to provide a tobacco stalk and leaf harvester that will harvest the stalks in a manner that will leave surrounding leaves intact with the stalk and which will not substantially damage the tobacco leaf material during the harvesting operation.

A further object of the present invention is to provide a method and apparatus for harvesting tobacco that decreases the production cost of tobacco per pound produced.

Another object of the present invention is to provide a method of harvesting tobacco that will produce tobacco material at a cost substantially less than the cost of conventional flue-cured or burley tobacco material, and which will be competitive with tobacco substitute material such as cellulose.

More particularly, it is an object of the present invention to provide a method of harvesting tobacco that substantially increases the production poundage of tobacco material per acre by first harvesting the primary crop and then cutting the stalks down to where a second voluntary sucker crop may grow and then harvesting the entire voluntary sucker crop material including stalk and leaf portions thereof.

Other objects and advantages of the present invention will become apparent from a study of the following description and the accompanying drawings which are merely illustrative of the present invention.

BRIEF DESCRIPTION OF THE DRAWINGS

FIG. 9 is a front fragmentary view of two successive circular saw blades of the stalk cutting head cutting a portion of a tobacco stalk into sections.

FIGS. 10 through 15 are a series of sequence views illustrating a suggested method of harvesting tobacco in accordance with the present invention.

TOBACCO HARVESTER AND STALK CUTTING HEAD

Figure 1:
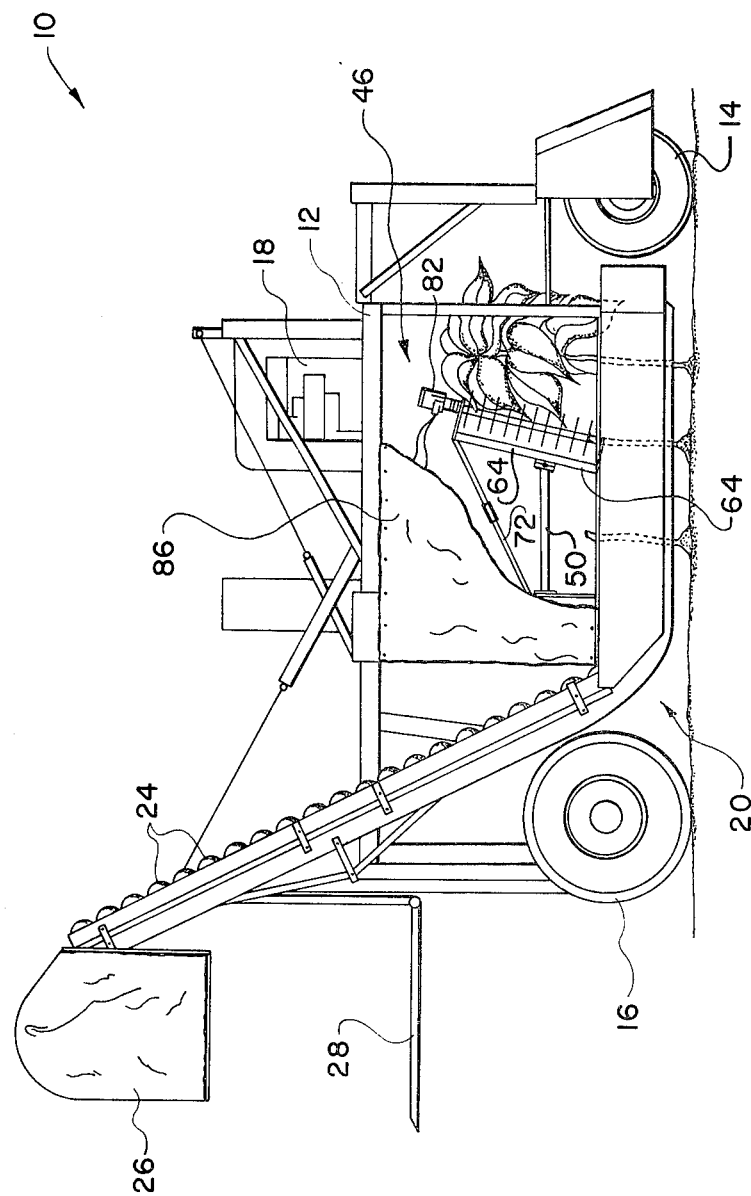
FIG. 1 is a side elevational view of the tobacco harvester of the present invention incorporating the stalk cutting head.

With further reference to the drawings, particularly FIGS. 1–7, the tobacco harvester of the present invention is shown therein and indicated generally by the numeral 10. Viewing the basic structure of the tobacco harvester 10, it is seen that the same includes a main frame structure 12 having front wheels 14 and rear wheels 16 (only one of the front and rear wheels being shown in FIG. 1). Disposed about the main frame structure is an engine 18 that is adapted to drive the harvester 10 and the other working components of the harvester.

A conveyor assembly, indicated generally by the numeral 20, is provided about each side of the harvester 10 and is generally operative to receive tobacco leaves and to convey them rearwardly along a generally horizontal longitudinal section and then generally upwardly towards the rear of the harvester where the leaves may be discharged from a discharge shroud 26 into a receptacle, trailer, or a bulk tobacco container such as the type shown in U.S. Pat. No. 3,948,553. In the embodiment illustrated each conveyor assembly 20 includes a chain link conveyor 22 that runs generally horizontally from a front portion of a harvester rearwardly a distance at which point the chain link conveyor is inclined generally upwardly and rearwardly therefrom such that it extends to the area of the discharge shroud 26. About the upper run of the chain link conveyor 22, there is provided a series of rollers 24 that preferably engage the upper run of the chain link conveyor 22 and are driven thereby such that tobacco material may pass between the chain link conveyor 22 and the upper rollers 24 during the conveying operation.

Disposed about the rear of the harvester 10 is a fork lift indicated by the numeral 28 that is powered hydraulically between upper and lower positions and which serves to support a trailer, receptacle, or box type bulk container underneath shroud 26.

Situated generally inwardly from the front horizontal sections of the conveyor assemblies 20 is a pair of laterally conveyors indicated generally by the numerals 30 and 32. The lateral conveyors 30 and 32 function to convey tobacco leaf material that fall thereon during the harvesting operation to the adjacent front horizontal conveyor sections of the conveyor assemblies 20. Disposed adjacent the rear portions of the lateral conveyors 30 and 32 are a series of conventional scavengers 34.

Figure 7:
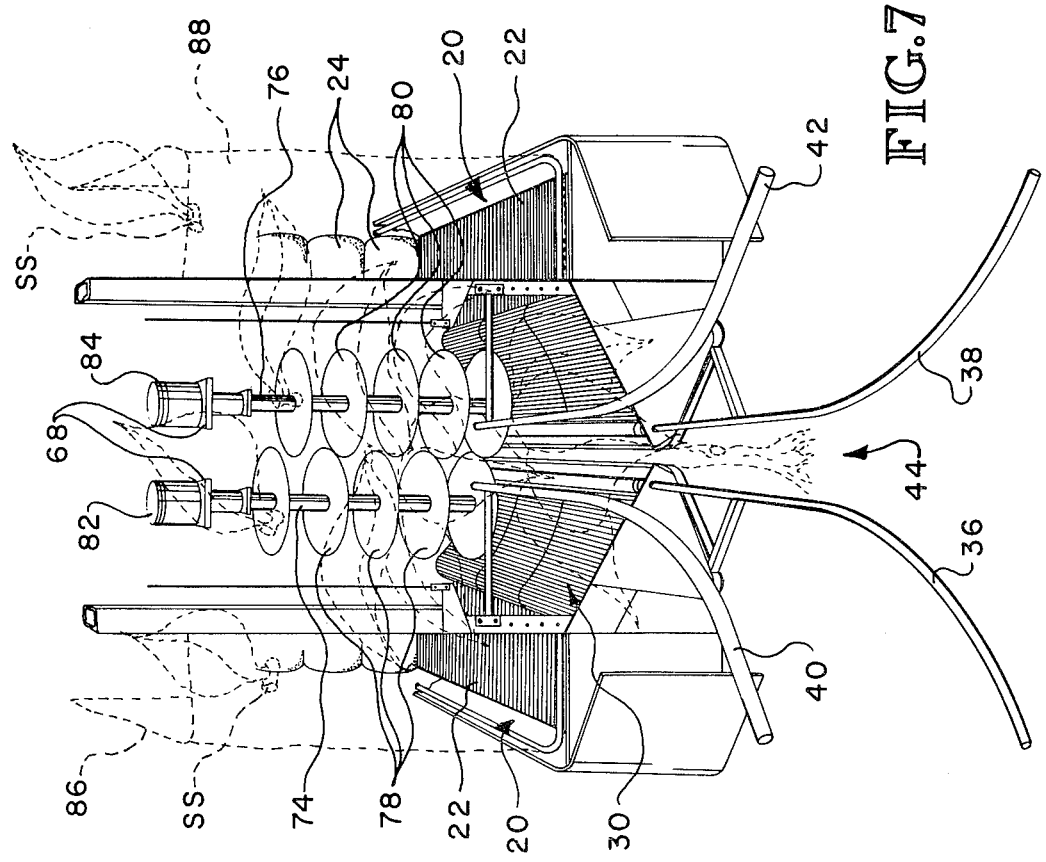
FIG. 7 is a fragmentary front elevational view of the tobacco harvester of the present invention illustrating the disposition of the circular saw blades of the stalk cutting head.

As seen in FIG. 7, the tobacco harvester 10 includes a pair of lower stalk guides 36 and 38 and an upper pair of stalk guides 40 and 42 which serve to converge the tobacco stalks in a row being harvested into the harvesting area of the harvester. Stalk guides 36, 38, 40 and 42 define a row inlet passing area, indicated generally by the numeral 44 in FIG. 7, and during the harvesting operation the stalks of a row generally pass into the harvester through this stalk row opening area 44.

Figure 2:
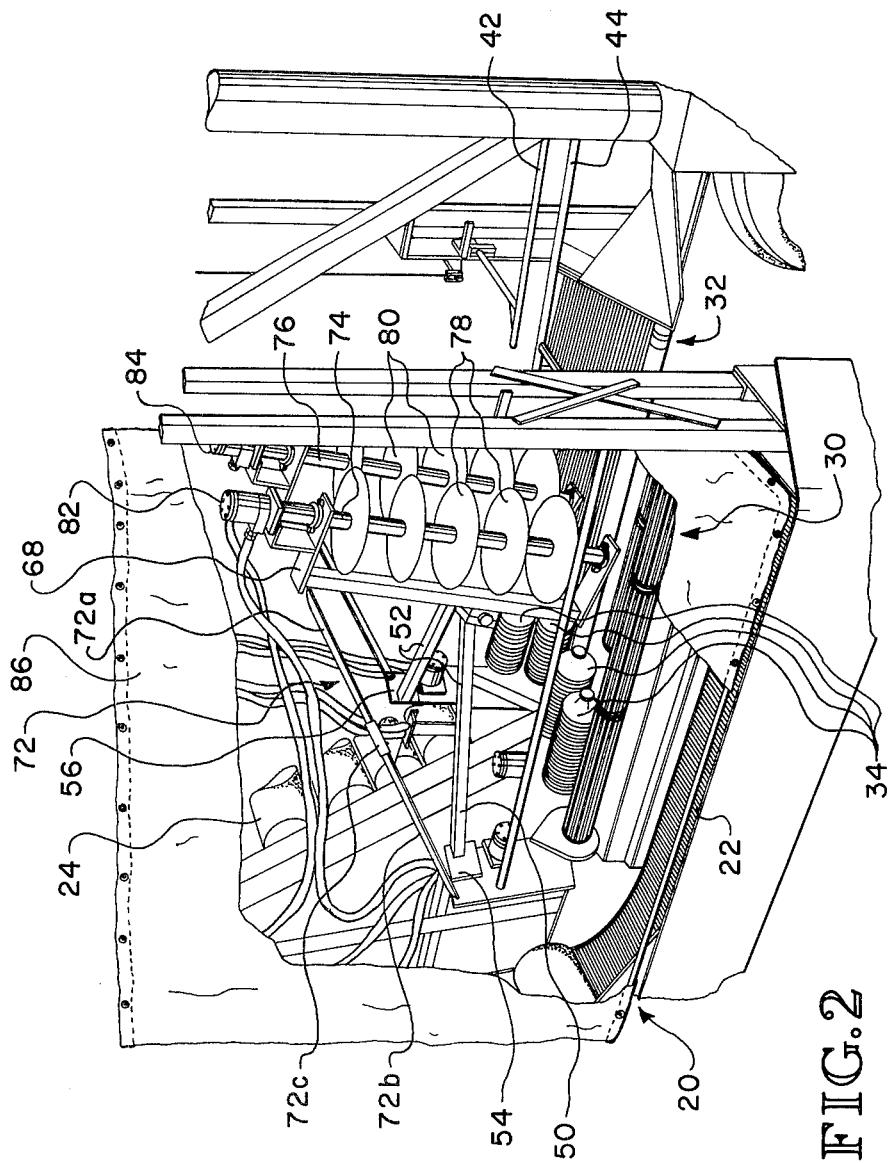
FIG. 2 is a fragmentary perspective view of a portion of the tobacco harvester and which particularly illustrates the stalk cutting head thereof and portions of the conveying means carried by said harvester.

With reference to FIGS. 1 and 2, a stalk cutting head or header, indicated generally by the numeral 46, is mounted to said harvester generally above the lateral conveyors 30 and 32 of the harvester. Stalk cutting head 46 comprises a support frame assembly, indicated generally by the numeral 48, that includes two horizontal supports 50 and 52 that extend rearwardly and outwardly from the forward portion of the cutting head where the rear ends of the horizontal supports 50 and 52 connect to respective back plates 54 and 56, as illustrated in FIG. 2. Secured to the forwardmost ends of the longitudinal supports 50 and 52 is a transverse shaft 58. Rotatively secured about opposite portions of shaft 58 is a pair of bearing blocks 60 and 62 which are in turn fixed to a pair of back members 64 and 66. Each back member 64 and 66 includes an upper end plate 68 and a lower end plate 70.

Extending between the upper end of the back members 64 and 66 are a pair of telescopic adjustment arms indicated generally by the numeral 72. The adjustment arms extend in a generally triangular fashion (similar to members 50 and 52) from the upper portion of the stalk cutting head 46 back to the back plates 54 and 56. Each adjustment arm 72 includes a front arm section 72a and a rear arm section 72b interconnected by a connecting section 72c. The intermediate end portions of the arm sections 72a and 72b are provided with adjustment openings that allow the respective sections 72a and 72b to slide together to vary the effective length of the arms as the back members 64 and 66 are rotatively adjusted about the axis of the transverse shaft 58.

Rotatively journaled between respective end plates 68 and 70 are a pair of drive shafts 74 and 76. A first set of circular saw blades, each saw blade indicated by the numeral 78, is secured to shaft 74 in axial spaced apart relationship between the end plates 68 and 70. Likewise, a second set of circular saw blades, each saw blade of the second set being indicated by the numeral 80, are secured in axial spaced apart relationship to shaft 76. A pair of hydraulic motors 82 and 84 are mounted above end plates 68 and operatively connected to respective shafts 74 and 76 for driving the shafts in counter directions with respect to each other as indicated by the directional arrows in FIGS. 5 and 6. As indicated, the leading cutting edge of the blades 78 and 80 are rotated such that they move from inner areas where the actual stalk cutting takes place, as illustrated in FIG. 9, forwardly and outwardly therefrom, again, as indicated by the directional arrows in FIGS. 5 and 6.

It should be noted as illustrated in FIGS. 3, 4, 7 and 9 that the first set of blades 78 are staggered on shaft 74 with respect to the second set of blades 80 secured on shaft 76. This means that the inner blade portions, indicated by 78a and 80a in FIG. 9 tend to lie above or below the adjacent blades to give rise to an overlapping relationship about the central area between the two circular saw blade sets 78 and 80. The stalk cutting head 46 is disposed about the harvester such that this overlapping area generally aligns with the row stalk opening area 44 such that the actual stalk cutting generally occurs in this central overlapping area.

As illustrated in FIG. 9, the entering stalk is cut into relatively short stalk sections SS by the cooperation of blades 78 and 80. The spacing between consecutive blades 78 and 80 may vary depending on the particular crop condition and the operation desired, but it is contemplated that a three inch spacing would be desirable.

Figure 5:
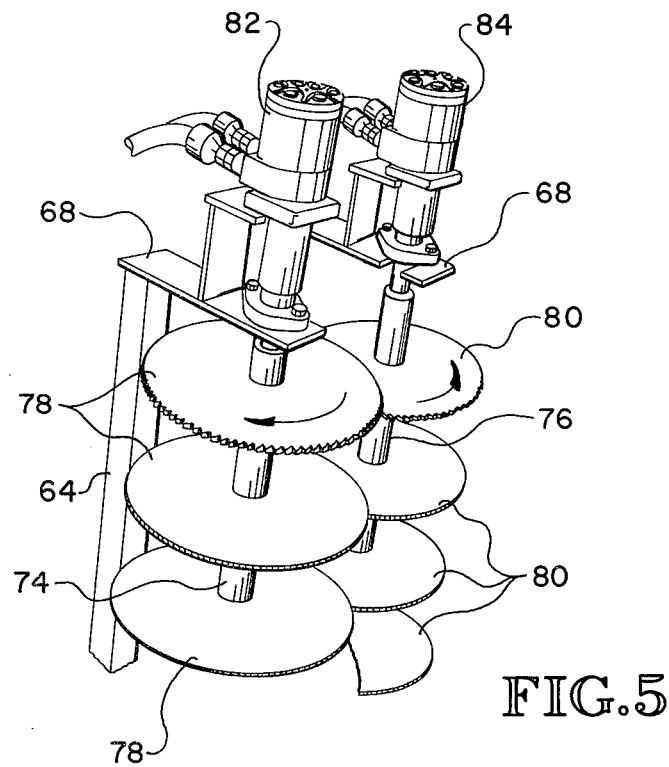
FIG. 5 is a fragmentary perspective view of a portion of the stalk cutting head illustrating portions of the two main drive shafts and a plurality of circular saw blades axially spaced and secured on the respective shafts.
Figure 6:
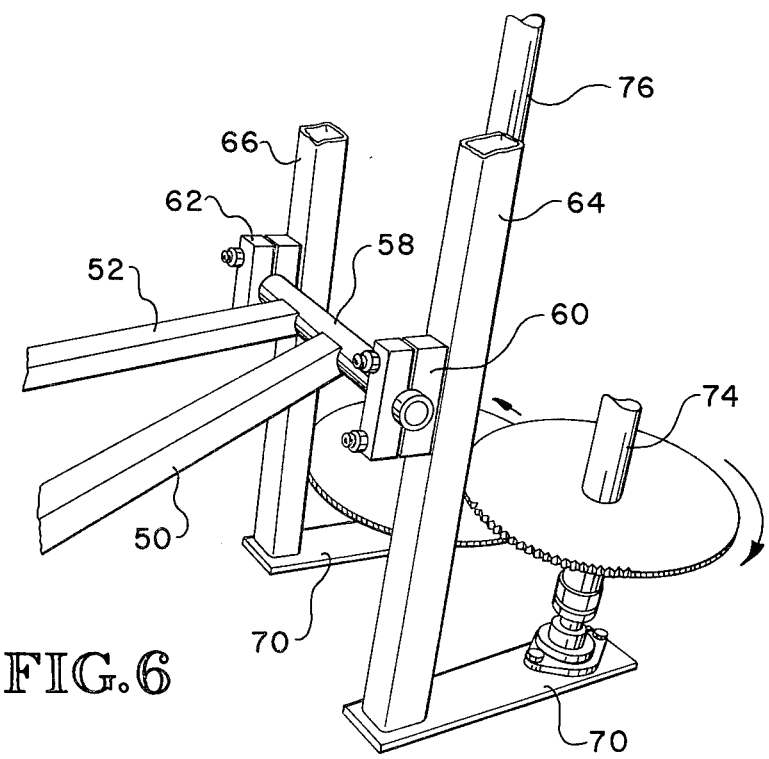
FIG. 6 is a fragmentary perspective view of a portion of the stalk cutting head illustrating the support frame assembly thereof that enables the stalk cutting head to be angularly adjusted about a transverse axis.
Figure 8:
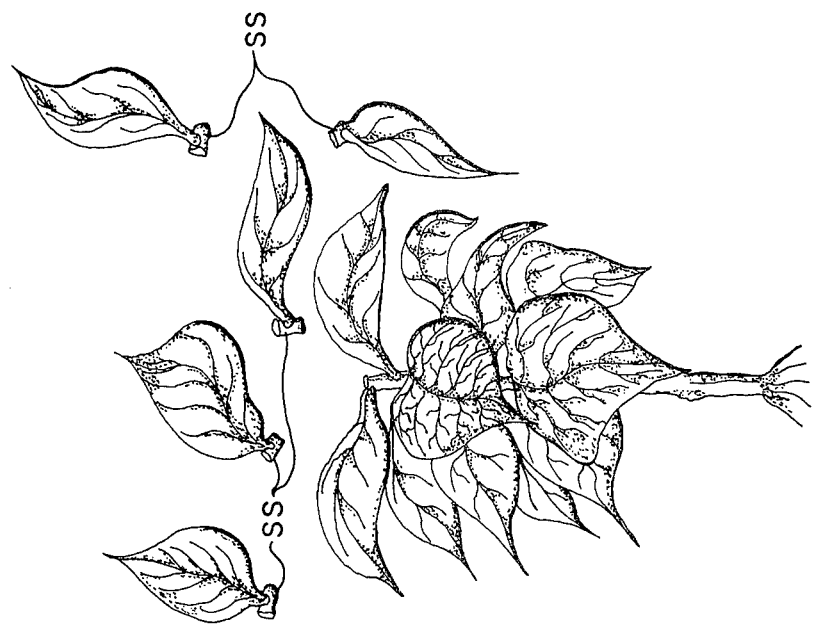
FIG. 8 illustrates the basic manner of cut stalk harvesting that results from harvesting a tobacco stalk with the stalk cutting head that forms a part of the present invention. The plurality of circular saw blades cooperate to cut the stalk into relatively short stalk sections and wherein the cutting action of the blades fling the cut stalk sections and attach leaf material outwardly from the stalk cutting head.

The fact that the blades 78 and 80 are driven in counter directions in accordance with the directional arrows of FIGS. 5 and 6 results in the respective cut stalk sections SS being flung outwardly towards both sides of the stalk cutting head 46 as illustrated in FIGS. 7 and 8. A retaining curtain 86 and 88 disposed on each side of the harvester about the outside area of the conveyor assemblies 20 retains or deflects the flung stalk sections SS such that they fall onto the chain slat conveyors 22 and are conveyed up the conveyor assemblies 20 where they are discharged about the rearmost upper terminal end thereof.

Figure 3:
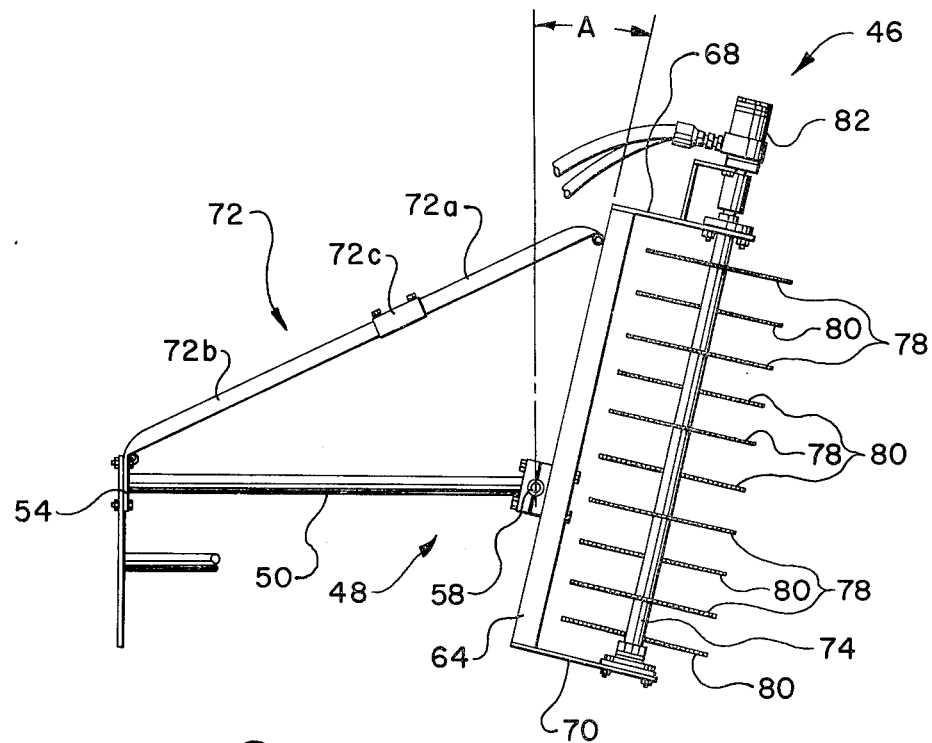
FIG. 3 is a side elevational view of the stalk cutting head disposed at an angle of approximately 15 degrees.
Figure 4:
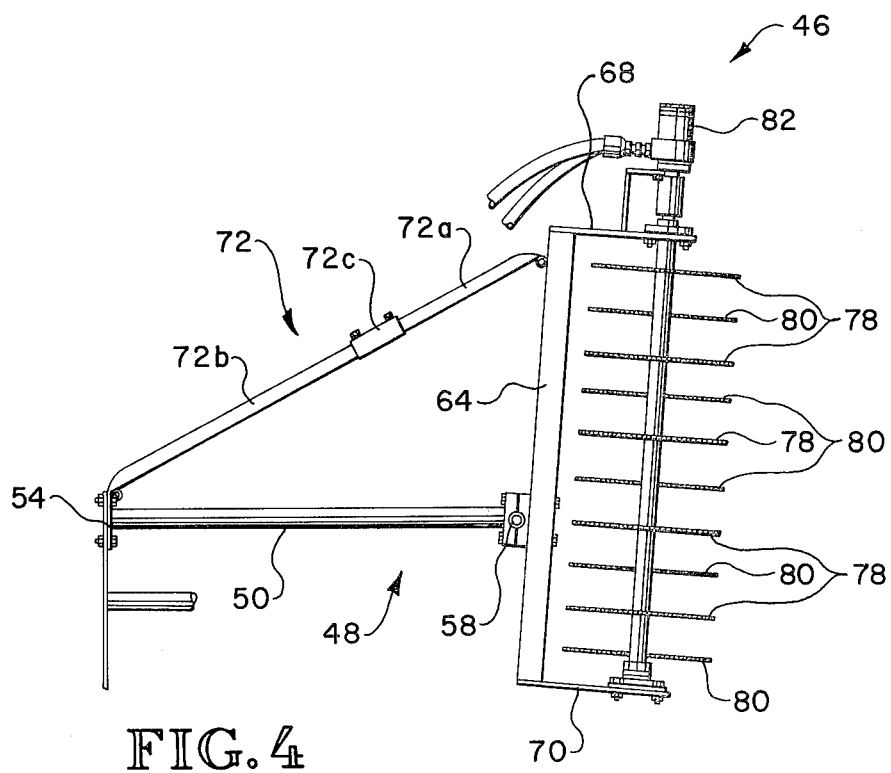
FIG. 4 is a side elevational view of the stalk cutting head with the same being angled less than the 15 degrees illustrated in FIG. 3.

It is contemplated that for best results the stalk cutting head 46 should be tilted approximately 15 degrees relative to a vertical line, as illustrated by angle A in FIG. 3. This means that when so tilted that the upper blades reach the tobacco crop material before the lower blades and consequently there is a generally downward cutting action on the stalks. This is especially beneficial since it minimizes recutting of the stalk sections SS. It should be noted that the stalk sections SS are generally cut along the axis of the stalks being harvested and that the surrounding leaves attached to the stalk remains substantially intact with the stalk sections and are conveyed therewith to the collection area that is normally supported by the fork lift 28 about the rear of the harvester. For certain crops and certain crop conditions, the position of the cutting head can be adjusted by rotating the same about the axis of shaft 58 by adjusting the length of the adjustment arms 72, such as the position shown in FIG. 4.

METHOD OF HARVESTING TOBACCO

With the stalk cutting head 46 described above in conjunction with the tobacco harvester 10, the basic method of harvesting tobacco entails aligning the row opening 44 with the row to be harvested and moving down the row such that the respective stalks of the crop are guided towards the stalk cutting head by the stalk guides 36, 38, 40 and 42. In harvesting the respective stalks and surrounding leaf material together, the respective circular saw blades 78 and 80 engage the stalk and cut at least a portion of the stalk into stalk sections SS. The cutting is achieved such that cutting the leaf material is minimized and such that substantial portions of the leaf material remain intact with the stalk. Driving the blades 78 and 80 in counter directions as discussed above results in the individual stalk sections SS being flung outwardly towards opposite sides of the stalk cutting head 46. The flung stalk sections are intercepted or retained by the curtains 86 and 88 which cause the tobacco material in the form of the cut stalk sections SS and the associated leaf material to drop downwardly onto the adjacent longitudinal sections of the conveyor assemblies 20. As illustrated in FIG. 9, as each stalk passes generally midway between the blades 78 and 80, respective successive blades cooperate to cut the entering stalk into multiple stalk sections SS.

It is appreciated that this basic method of harvesting tobacco differs from the traditional and conventional practice of defoliating leaves from the stalks and leaving the stalks standing in the field.

As discussed hereinbefore, it is a concern of the present invention to lower the production cost of tobacco material. The method and apparatus of the present invention directs itself to this area in two principal ways by increasing the production poundage per acre and reducing the overall harvesting cost.

The following is an example of a method and cultural practice of producing and harvesting tobacco utilizing the tobacco harvester 10 of the present invention in such a manner that the production cost of tobacco material can be substantially reduced relative to conventional flue-cured and burley tobacco produced here in the United States. This basic method and cultural practice entails allowing the tobacco plant to produce a double crop during any one season. The primary plant is allowed to first grow to maturity as illustrated in FIG. 10. After maturity, it is suggested that leaves about the lower portion of the primary plant be primed or defoliated in a conventional fashion by either hand priming or with a conventional automatic tobacco harvester such as the type shown in U.S. Pat. No. 3,841,071. The number of leaves that are primed or defoliated may vary depending on the type of crop, the crop maturity and other variables. The lower leaf portion of the tobacco plant shown in FIG. 11 has been primed or defoliated.

After defoliating the lower leaf portions of the tobacco plant, the tobacco harvester 10 disclosed herein is utilized to directly harvest the upper stalk of the tobacco plant in one field pass. The stalk cutting head 46 is adjusted such that the blades 78 and 80 will cut the top portion of the entire tobacco plant, including stalk and surrounding leaf material, simultaneously together and leave the stalk standing in the field as shown in FIG. 12 which would typically extend approximately 18 inches above ground. During stalk harvesting, the upper stalk portion would be cut into stalk sections SS in accordance with the basic description as already discussed. The respective cut stalk sections SS and associated attached leaf material is conveyed by the conveyor assemblies 20 into a trailer, receptacle, or bulk tobacco container. This tobacco leaf material is then cured and dried in a conventional manner such as with a bulk tobacco barn.

Next the upstanding stalk as shown in FIG. 12 is cut down to approximately 6 to 8 inches as indicated in FIG. 13. This can be accomplished in several different ways, but it is desirable to remove the stalks from the field and this, of course, can be accomplished by adjusting the stalk cutting head 46 of the harvester 10 to cut and remove the desired stalk portions. Once the stalk has been cut down as illustrated in FIG. 13, a second tobacco growth foliage will result therefrom. This growth is sometimes referred to as a voluntary sucker growth. In time, this voluntary sucker growth will grow to a mature state, as illustrated in FIG. 14, and one might expect this growth material to include as many as two or three stalks itself that may branch from the short stub stalk illustrated in FIG. 13.

After the maturity of the voluntary sucker crop as generally shown in FIG. 14, the harvester 10 and the stalk cutting head 46 is again utilized to directly harvest the entire voluntary sucker crop in one single field pass. This involves adjusting the stalk cutting head 46 to an appropriate height such that the entire voluntary sucker crop including stalk and associated sucker leaf material is cut and flung outwardly to where the same falls on the conveyor assemblies 20 and conveyed to a receptacle supported on the fork lift 28. As with the lower crop portion first defoliated from the stalk, and the upper stalk and leaf material as defoliated in FIG. 11, this sucker crop material is also cured and dried by conventional tobacco curing and drying techniques.

The result of this basic method of harvesting tobacco can result in the production of approximately 5000 pounds of tobacco per acre, as compared to typical flue-cured productions which may range in the neighborhood of 2500 to 3000 pounds per acre. One can expect the first crop, that is that material coming from defoliating the lower leaves combined with the upper stalk material to account for about 2800 to 3000 pounds per acre. The second crop or the voluntary sucker crop can account for approximately 1800 to 2000 pounds per acre. It is appreciated that these figures can vary depending on the climate and weather, and other crops conditions and other production variables. It should be noted that the voluntary sucker crop material may be very desirable since it presents a lower nicotine and lower tar content than other conventional harvested tobacco leaf material.

In use, the lower defoliated leaves may be cured and dried and sold in conventional fashion. They also may be combined or utilized in a manner suggested for the upper primary stalk crop material (shown in FIG. 11) and the voluntary sucker crop material as illustrated in FIG. 14. Here because the tobacco material would include stalk portions along with the sucker stalk material, along with the sucker leaf material, it is contemplated that this material can be used in a manner comparable to the suggested manner of use of tobacco substitutes. Here this material can be used as a filler or spreader type material and can even be placed in a homogeneous sheet. There are many and various ways to use this tobacco material, and this flexibility is one of the principal advantages of adopting the basic cultural and methods of producing tobacco as disclosed herein.

It is to be understood that other basic methods of production and harvest may be used other than that just described relative to FIGS. 10 through 15.

In planting the tobacco compatible with the method and cultural practice disclosed herein, it should be pointed out that the tobacco although placed in rows can be planted very close together in the rows as compared to the conventional spacing that might be found in conventional practices of flue-cured and burley tobacco production today. Again this gives rise to a greater potential for production. In this regard, the tobacco can be directly field seeded by a tape planter, as contrasted to the very laborious, expensive and time consuming task of transplanting plants from a plant bed to the field by a mechanical transplanter which is customary in flue-cured tobacco production.

The terms "upper," "lower," "forward," "rearward," etc., have been used herein merely for the convenience of the foregoing specification and in the appended claims to describe the method and apparatus for harvesting tobacco and its parts as oriented in the drawings. It is to be understood, however, that these terms are in no way limiting to the invention since the method and apparatus for harvesting tobacco may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. In a tobacco harvester having a mobile main frame and conveying means associated with said harvester for conveying tobacco material along said harvester during the harvesting operation, the improvement comprising a harvesting assembly including:

(a) a support frame assembly;

(b) at least two laterally spaced shafts rotatively journaled within said support frame assembly;

(c) a plurality of circular saw blades secured on each of said shaft and rotatable therewith, said circular saw blades being axially spaced on each respective shaft such that the circular saw blades of one shaft cooperate with the circular saw blades on the other shaft to cut portions of entering tobacco stalks into stalk segments and, wherein the circular saw blades secured on the two respective shafts are disposed in staggered relationship such that each circular saw blade is disposed in a separate and distinct plane relative to any one of the adjacent circular saw blades on the adjacent shaft so as to define a generally vertical stalk cutting area that lies generally midway between the outer extremities of the circular saw blades secured to said shafts, and wherein said staggered circular saw blades are disposed such that an inner portion of a respective circular saw blade overlies an area occupied by an inner portion of an adjacent lower disposed circular saw blade such that in harvesting a resultant cut stalk segment is cut about one end by a circular saw blade of one shaft and about the other end by another circular saw blade on the other shaft;

(d) drive means operatively connected to said shafts for rotatively driving said shafts and the circular saw blades secured thereon, said driving means for driving said shafts including means for driving said shafts in counter directions relative to each other with the respective circular saw blades secured on each shaft being driven such that the leading cutting edge of the blades generally move in an outwardly directed arcuate path relative to the areas occupied by the inner portions of said blades during the harvesting operation in order that the blades will impart an outward directed flinging action to the cut stalk segments; and (e) wherein said support frame assembly includes mounting means for pivotably mounting said support frame assembly about a transverse axis relative to said harvester such that said support frame assembly may be angularly adjusted about said transverse axis for positioning the respective circular saw blades in an efficient harvesting posture.

2. The improved tobacco harvester of claim 1 wherein said support frame assembly includes mounting means for mounting said support frame assembly such that the two shafts supported thereby are normally angled forwardly such that the respective shafts extend generally upwardly and slightly forwardly which generally results in the harvesting of respective stalks from the top of the stalks downwardly.

3. A tobacco harvester adapted to harvest tobacco stalk sections and associated leaf material comprising: a mobile main frame; conveying means carried by said mobile main frame for conveying the harvested stalk sections and associated leaf material along said harvester; a header assembly for harvesting whole stalk portions of a tobacco plant by directly engaging portions of the tobacco stalks and cutting the stalk into sections, said header assembly including a support frame assembly; a stalk cutting header including a pair of laterally spaced apart shafts rotatively mounted to said support frame assembly, and a plurality of axially spaced circular saw blades secured to each shaft and rotatable therewith, said circular saw blades on each shaft being disposed in a staggered relationship relative to the circular saw blades on the other adjacent shaft such that the inner disposed portions of said circular saw blades on one shaft projects generally into the cutting plane of the circular saw blades disposed on the other shaft and vice versa, thus defining a stalk entry area generally midway between said shafts where the inner disposed portions of the respective circular saw blades overlap to form a stalk cutting area about said heater assembly, such that any two successive circular saw blades may cooperate to cut a stalk section of a length generally corresponding to the distance between the successive circular saw blades during the harvesting operation; drive means operatively connected to said pair of shafts for rotatively driving said shafts and the circular saw blades secured thereon in counter circular directions such that during the harvesting operation respective stalks entering the stalk cutting header are cut into stalk sections and the cut stalk sections and the associated leaf material are directed to said conveying means of said harvester, said drive means including means for driving the circular saw blades such that the leading cutting edge of each blade is driven in a generally inwardly to outwardly direction with respect to the header, and wherein the stalk cutting action of the driven blades flings cut stalk sections outwardly towards both sides of said header; said support frame assembly including means for pivoting said stalk cutting header about a transverse axis for enabling said stalk cutting header to be angularly disposed relative to entering stalks such that said stalk cutting head may be normally positioned such that the axis of each of said shafts extend generally upwardly and slightly forwardly where the circular saw blades disposed about the upper portion of said stalk cutting header lie just forwardly of the circular saw blades disposed about the lower portion of the stalk cutting header; and retaining means disposed outwardly on each side of said stalk cutting header adjacent said conveying means for retaining and directing cut stalk sections being flung outwardly by said stalk cutting header during the harvesting operation, said retaining means positioned with respect to said stalk cutting header and said conveying means such that cut stalk sections directed thereagainst are caused to fall onto said conveying means.

4. The tobacco harvester of claim 3 wherein said means for pivoting said stalk cutting header include a transverse shaft having said support frame assembly pivotably mounted thereon, and telescopically adjustable connecting arm means fixed at one end to said support frame assembly and extending therefrom where the other end is fixedly supported, and wherein said support frame assembly can be adjusted by telescopically adjusting said arm means and allowing said support frame assembly to pivot about the axis of said transverse shaft.

* * * * *